United States Patent [19]

Lee

[11] Patent Number: 4,713,555
[45] Date of Patent: Dec. 15, 1987

[54] BATTERY CHARGING PROTECTION CIRCUIT

[75] Inventor: Robert D. Lee, Denton, Tex.

[73] Assignee: Dallas Semiconductor Corporation, Dallas, Tex.

[21] Appl. No.: 36,021

[22] Filed: Apr. 8, 1987

[51] Int. Cl.⁴ .............................................. H02J 9/02
[52] U.S. Cl. ........................................ 307/66; 307/64; 307/150; 365/229
[58] Field of Search ................ 307/64, 66, 150, 252 J, 307/252 K, 576, 585, 579; 361/405, 401, 321 C; 365/229

[56] References Cited

U.S. PATENT DOCUMENTS

| | | | |
|---|---|---|---|
| 4,104,538 | 8/1978 | Davies | 307/66 X |
| 4,288,865 | 9/1981 | Graham | 307/64 X |
| 4,451,742 | 5/1984 | Aswell | 307/66 |
| 4,617,473 | 10/1986 | Bingham | 307/66 |
| 4,629,905 | 12/1986 | Kraicar | 307/64 X |
| 4,638,175 | 1/1987 | Bradford et al. | 307/66 X |
| 4,645,943 | 2/1987 | Smith et al. | 307/64 X |

*Primary Examiner*—William M. Shoop, Jr
*Assistant Examiner*—Shik Luen Paul Ip
*Attorney, Agent, or Firm*—Leonard & Lott

[57] ABSTRACT

A battery charging protection circuit for use in a power controller circuit utilizes the base emitter junction of a first NPN bipolar transistor to permit current to flow only from a backup battery input terminal to a power supply voltage output terminal of the power controller circuit. The base emitter junction and base collector junction of a second bipolar transistor are used to permit current to flow only in the direction from the backup battery input terminal to the substrate of the power controller circuit.

6 Claims, 7 Drawing Figures

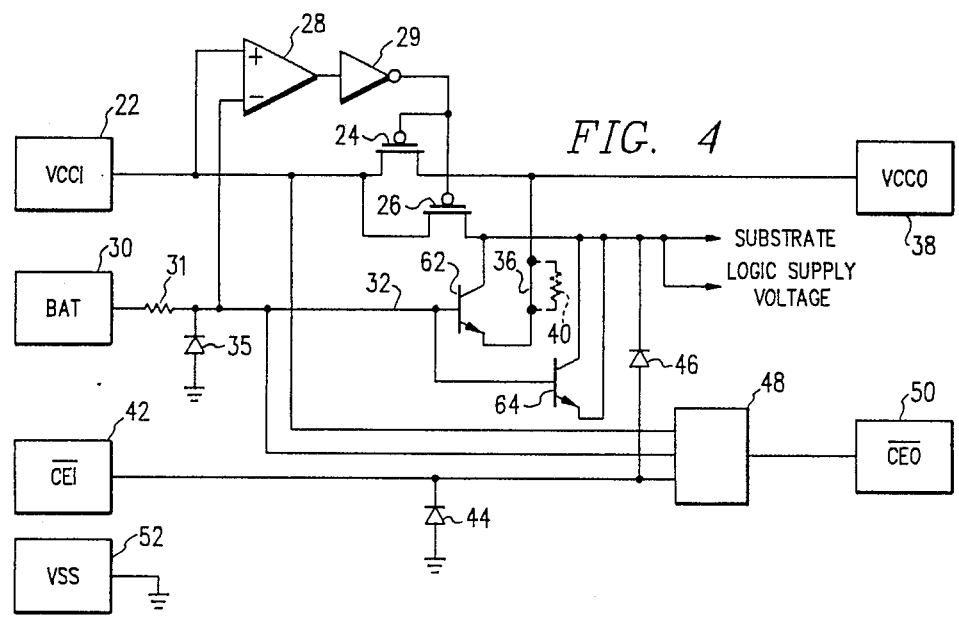
FIG. 3A
FIG. 3B
FIG. 4
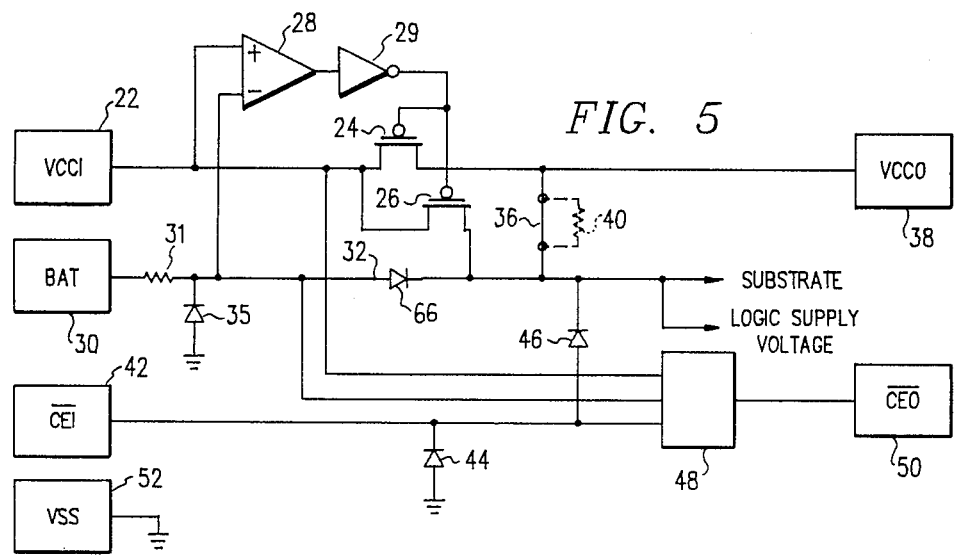
FIG. 5

BATTERY CHARGING PROTECTION CIRCUIT

TECHNICAL FIELD

This invention relates to power supply control circuits, and more particularly, to circuits for controlling backup batteries.

BACKGROUND OF THE INVENTION

Power controller circuits presently exist which provide automatic sensing of a primary power source voltage and couple the primary power source voltage to an electrical load when the primary power source voltage is above a predetermined threshold voltage and which switch a backup battery to the electrical load when the primary power source voltage is below the threshold. Some of these power controllers have been embodied in CMOS integrated circuits which utilize MOS transistors to couple the primary power source to the electrical load or the backup battery voltage to the electrical load.

A problem which may develop with respect to power controllers with lithium energy cells as backup batteries is that the lithium energy cells are sensitive to charging currents and the lithium cells tend to fail if the cells are recharged even by a small amount.

As will be discussed more thoroughly below with respect to FIG. 2, it is possible, when the primary power source has failed, to charge the lithium cell through the MOS transistors via a signal line to the electrical load which couples through the electrical load a voltage greater than the battery voltage which in turn is impressed upon the output voltage terminal of the power controller to thereby transfer charge into the lithium energy cell backup battery.

Therefore, it can be appreciated that a CMOS integrated circuit power controller circuit which protects against charging of the backup battery is highly desirable.

SUMMARY OF THE INVENTION

It is, therefore, an object of this invention to provide a power controller circuit for use in a CMOS integrated circuit which will prevent charging of the backup battery.

As shown in an illustrated embodiment of the invention, a power controller circuit embodiment in a CMOS integrated circuit has switching circuitry for coupling a primary power supply input terminal to a power supply voltage output terminal and to the substrate of the integrated circuit under a first predetermined condition and for providing a high impedance between the primary power supply input terminal and the power supply voltage output terminal under a second predetermined condition. A first diode is connected between the battery backup input terminal and an internal node, and the internal node is connected to the power supply voltage output terminal through a conductive device. A second diode is connected between the backup battery and the substrate of the integrated circuit.

In a further aspect of the invention, the diode between the backup battery input terminal and the internal node and the diode between the battery backup input terminal and the substrate is formed by the base emitter junction of an NPN transistor, the collector of which is connected to the substrate of the CMOS integrated circuit.

Also shown in an illustrated embodiment of the invention, a power controller switching circuit embodied in a CMOS integrated circuit includes a switching means coupled between the primary power supply input terminal, the substrate of the integrated circuit, and the power supply voltage output terminal for forming a conductive path between the primary power supply input terminal, the substrate of the integrated circuit, and the power supply voltage output terminal for a first predetermined condition and for providing a high impedance between the primary power source input terminal and the power supply voltage output terminal under a second predetermined condition. A diode is coupled between the backup battery input terminal and the substrate, and a conductive device is coupled between the substrate and the power supply voltage output terminal.

BRIEF DESCRIPTION OF THE DRAWINGS

The aforementioned and other features, characteristics, advantages, and the invention in general, will be better understood from the following, more detailed description when read in conjunction with the accompanying drawings in which:

FIGS. 3A and 3B are partial cross sectional representations of an integrated circuit showing alternative embodiments of a diode formed in an integrated circuit;

FIG. 4 is another schematic diagram of a power controller circuit containing a battery charging protection circuit according to the present invention; and FIG. 5 is a schematic diagram of an alternate embodiment of a power controller containing a battery charging protection circuit according to the present invention.

It will be appreciated that for purposes of instruction, the accompanying drawings have not necessarily been drawn to scale; and that for clarity and where deemed appropriate, reference numbers have been repeated in the figures to show corresponding features.

DESCRIPTION OF THE PREFERRED EMBODIMENTS

Figure 1A:
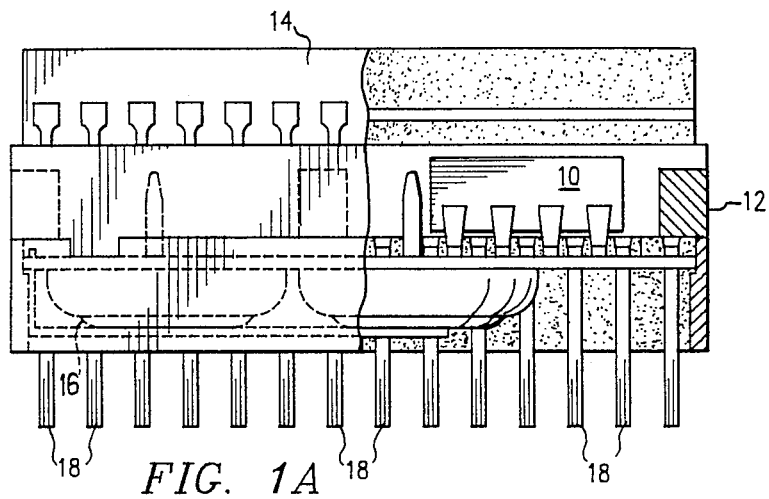
FIG. 1A is a side break away view of an integrated circuit socket which contains a backup battery and an integrated circuit controller containing a battery charging protection circuit according to the present invention; and also shows a break away view of an electrical load comprising an integrated circuit inserted in the integrated circuit socket.

The present invention is applicable for use in power controller circuits which function to couple a primary power source to a power supply voltage output terminal, or to couple a backup battery power source to the power supply output terminal when the primary power supply voltage is below a predetermined voltage. Such a power controller circuit is shown contained in a power controller integrated circuit 10 in FIG. 1A and FIG. 1B. The power controller integrated circuit 10 is located inside an integrated circuit socket 12. Inserted into the socket 12 is an integrated circuit static RAM 14. Located within the socket 12, in addition to the power controller integrated circuit 10, are one or two batteries 16 and 17 and a plurality of socket pins 18 for connection to a printed circuit board (not shown) of a host system, and a plurality of socket springs 20 for electrically contacting and holding the static RAM 14 in the socket 12.

Figure 1B:
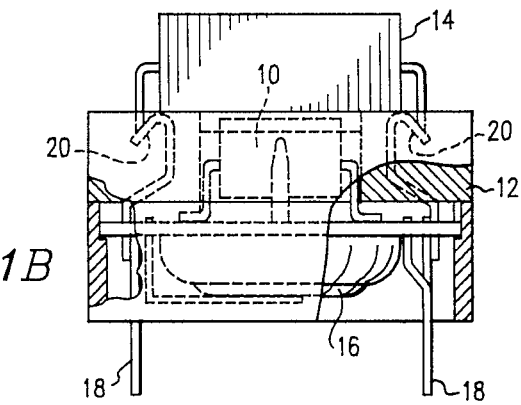
FIG. 1B is an end break away view of the integrated circuit socket and electrical load of FIG. 1A.

While most of the socket pins 18 are connected directly to the socket springs 20 and thus directly to the corresponding pins of the static RAM 14, as shown in the left hand break away portion of FIG. 1B, certain of the pins 18 are not connected directly to the pins of the static RAM 14 but rather are connected to the power controller integrated circuit 10 as shown in the break away portion on the right hand of FIG. 1B. In the preferred embodiment of the invention, the pin supplying VCC, or the positive supply voltage, to the static RAM 14 is not routed directly from the pins 18 to the static RAM 14; but, instead, is routed to the power controller integrated circuit 10, and an output terminal of the power controller integrated circuit 10 is connected to the VCC input pin of the static RAM 14.

In the same manner, the chip enable bar input signal is connected through the power controller integrated circuit 10 to allow the power controller integrated circuit 10 to have control of the chip enable input to the static RAM 14. The static RAM 14 is designed to operate with reduced power consumption when its chip enable bar input is at a high logic level. When the power controller circuit in the power controller integrated circuit 10 detects that the primary power source voltage is below a predetermined level, the power controller integrated circuit 10 forces the chip enable bar input to the static RAM 14 to a high logic level; thus, advantageously the static RAM 14 is put in a reduced power consumption mode when power to the static RAM 14 is being supplied by the backup batteries 16 and 17.

The power controller integrated circuit 10 is connected to the VSS, or ground, pin of the static RAM 14 and to the ground pin of the socket pins 18.

Figure 2:
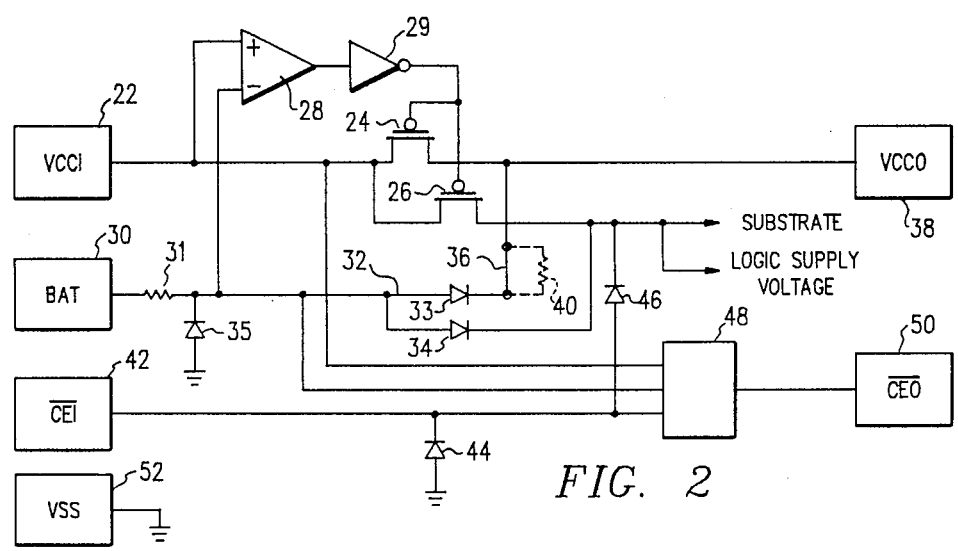
FIG. 2 is a schematic diagram of a power controller circuit containing a battery charging protection circuit according to the present invention.

Turning now to FIG. 2, a schematic diagram is given of the power controller circuit containing a battery charging protection circuit according to the present invention and used in the power controller integrated circuit 10 of FIG. 1. A primary power source voltage is received at a primary power source input terminal 22 which in turn is connected to the source of a first P-channel series pass transistor 24 and to the source of a second P-channel series pass transistor 26. The primary power supply input terminal 22 is also connected to a positive input terminal of a comparator 28 the output of which is connected to the input of an inverter 29. The output of the inverter 29 is connected to both gates of the P-channel series pass transistors 24 and 26. A second input terminal, a backup battery input terminal 30 is connected to a first end of a current limiting resistor 31, the second end of which is connected to an internal node 32, to a negative input terminal of the comparator 28, to the anode of a first diode 33, and to the anode of a second diode 34. The second end of the resistor 31 is also connected to the cathode of an input protection diode 35, the anode of which is connected to ground. The cathode of diode 33 is connected to one end of a conductor 36, the other end of which is connected to the drain of the P-channel series pass transistor 24 and also to a power supply output terminal 38.

An option in the power controller circuit shown in FIG. 2 is to replace the conductor 36 with a current limiting resistor 40 shown in outline in FIG. 2. The resistor 40 is formed prior to the metalization process when the integrated circuit is fabricated and the conductor 36 is an option which is put in place or left out when the metalization is formed.

Continuing with the description of the battery charging protection circuit of FIG. 2, the cathode of diode 34 is connected to the drain of the P-channel series pass transistor 26 and is also connected to the N-type substrate of the CMOS integrated circuit in which the power controller integrated circuit is fabricated. The logic circuitry of the power controller circuit receive their positive supply voltage from the substrate. The comparator 28 receives its positive supply voltage from the primary power source input terminal 22. A third input terminal, the chip enable input terminal 42, $\overline{\text{CEI}}$, is coupled to the cathode of a fourth diode 44, the anode of which is connected to ground, and to the anode of a fifth diode 46, the cathode of which is connected to the substrate. The $\overline{\text{CEI}}$ input terminal 42 is also connected to the input of a subcircuit 48. The output of the subcircuit 48 is connected to a second output terminal, a chip enable bar output terminal 50, designated as $\overline{\text{CEO}}$. The subcircuit 48 is also connected to the primary power source input terminal 22 and the node 32. A fourth input terminal, the VSS input terminal 52, is connected to the ground node of the power controller circuit.

The resistor 31 is a current limiting resistor, and in conjunction with diode 33 satisfies Underwriters Laboratories standards requiring two components between a lithium energy cell and a power supply terminal.

In the preferred embodiment, the power controller circuit is designed to operate with a primary power supply voltage of +5 volts +/− 10% and a nominal backup battery voltage of +3 volts from a lithium energy cell.

In operation, the power controller circuit shown in FIG. 2 operates by comparing the voltage at the primary power source input terminal 22 to the voltage at the node 32 by the use of the comparator 28. If the primary power source voltage is greater than the voltage at the node 32, then the P-channel series pass transistors 24 and 26 are enabled (made conductive) to pass the primary power source voltage to the power supply output terminal 38 and also to the N-type substrate of the power controller integrated circuit. With the primary power supply voltage greater than the voltage at node 32 and with negligible voltage drop across the P-channel series pass transistors 24 and 26, the diodes 33 and 34 are back biased; and thus current does not pass through either of the diodes 33 or 34. When the primary power supply voltage is less than the voltage at node 32, the comparator 28 produces a low logic level at its output terminal which is inverted by the inverter 29 to disable (make non-conductive) the P-channel series pass transistors 24 and 26. As used herein the term "low logic level" means a logic level having a voltage near ground, and the term "high logic level" means a logic level having a voltage near the voltage of the substrate. For such condition, the backup battery voltage at input terminal 30 is provided through the resistor 31, the diode 33, and the conductor 36 (or alternatively through the resistor 40) to the power supply output voltage terminal 38. Also, the backup battery voltage is provided through the resistor 31 and the diode 34 to provide positive voltage for the substrate and the supply voltage for the logic circuitry of the power controller circuit.

The logic gate 29 has an additional impedance from its input terminal and ground so that if the primary power source is unable to power the comparator 28, the inverter 29 will still have a high logic level at its output terminal.

The $\overline{CEI}$ input terminal 42 receives a chip enable bar signal from the printed circuit board of the host system and passes the chip enable bar signal through the logic circuit 48 to the $\overline{CEO}$ output terminal 50 without inversion when the voltage applied to the primary power source input terminal 22 is greater than a second predetermined voltage which is generally greater than the battery voltage. In the preferred embodiment, the second predetermined voltage is slightly less than the specified lower operating voltage limit (+4.5 volts) of the primary power supply voltage. When the voltage at the primary power source input terminal 22 drops below the second predetermined voltage, the subcircuit 48 forces the $\overline{CEI}$ output terminal 50 to a high logic level, thereby forcing the static RAM 14 to its reduced power consumption mode. In addition, this action prevents spurious signals which may appear on the $\overline{CEI}$ input terminal 42 from causing incorrect operation of the static RAM 14 when the driving circuit, such as a microprocessor, does not operate properly due to the falling primary power supply voltage. The subcircuit 48 has a comparator similar to the comparator 28 which compares the voltage at the node 32 to a fraction of the voltage at the primary power source input terminal 22 to determine if the voltage at the primary power source input terminal 22 is greater or less than approximately $1\frac{1}{2}$ times the voltage at the node 32 in the preferred embodiment. The other circuitry of the logic circuit 48 are circuits well known in the art, and for purposes of clarity the detail circuitry of the subcircuit 48 is not shown in detail in FIG. 2.

In previous circuits of this type, series pass MOS transistors were used in place of the diodes 33 and 34. A problem which developed in these previous circuits was that the backup battery could be charged through the MOS transistors. For example, if there would be a failure of the primary power source voltage at input terminal 22 but not a failure of the logic level driving the $\overline{CEI}$ input terminal 42, a +5 volts appearing at the $\overline{CEI}$ input terminal 42 would be coupled through diode 46 into the substrate of the integrated circuit and then back into the backup battery input terminal 30 to effectively charge the backup battery, which is destructive to lithium energy cells used as the backup batteries. While it might be possible to remove the diodes 44 and 46 which are used for static voltage input protection, these same types of diodes appear in the address and data input lines of the static RAM 14. Thus it is possible for the +5 volts appearing at the address input lines or the data input lines of the static RAM 14 to be coupled back through the static RAM 14 and into the output voltage supply terminal 38 of the power controller integrated circuit 10 and to charge the batteries 16 and 17 connected to the backup battery input terminal 30. Therefore, it can be appreciated that the diodes 33 and 34 operate to prevent this reverse current flow since diodes 33 and 34 will not conduct any significant current if their cathodes are at a greater voltage than their anodes.

As shown in FIG. 3A and FIG. 3B, there are two conventional methods of forming a diode in an N type substrate of a CMOS integrated circuit. In FIG. 3A, the anode of a diode is formed by P+ diffusion 54 into the N⁻ substrate 56 of the integrated circuit. In FIG. 3B, the anode of the diode is the P⁻ diffusion 58 into the N⁻ substrate 56, and the cathode of the diode is formed by a second diffusion, an N⁺ region 60 into the P⁻ region 58. An examination of the circuit in FIG. 2 together with the diode formed in FIG. 3A will show that the diode formed in FIG. 3A cannot be used for the diode 33 in FIG. 2, since to do so would force the cathode of diode 33 to be connected directly to the substrate. Thus, the diode formed according to FIG. 3B must be used, at least for the diode 33 of FIG. 2. For symmetry, it is preferable to form the diodes 33 and 34 identically in order to guarantee that the substrate is at least as positive as the power supply output terminal 38.

Upon examination of the diode of FIG. 3B, it will be appreciated that the NPN structure forms an NPN bipolar transistor in which the N⁻ substrate 56 is a collector of the bipolar transistor, the P⁻ region 58 is the base of the bipolar transistor, and the N⁺ region 60 is the emitter of the bipolar transistor.

FIG. 4 is a schematic diagram of the power controller circuit as shown FIG. 2 but in which the diodes 33 and 34 have been replaced by bipolar transistors 62 and 64 respectively. The bases of the bipolar transistor 62 and 64 are connected to the second end of the resistor 31, and the collectors of the bipolar transistors 62 and 64 are connected to the substrate. The emitter of the bipolar transistor 62 is connected to the first end of the conductor 36 and the resistor 40. The emitter of the bipolar transistor 64 is connected to the substrate.

An alternative embodiment for the battery charging protection circuit is shown in FIG. 5 in which the bipolar transistors 62 and 64 have been replaced by a single diode, 66, which is connected directly to the substrate of the CMOS integrated circuit. The conductor 36 (or, alternatively, the resistor 40) is connected between the substrate and the power supply output terminal 38.

For certain applications there may be concern that the power controller integrated circuit 10 will latch up if the static RAM 14, or other electrical load, is connected to the power supply output terminal 38 when the power controller integrated circuit chip 10 is in the battery backup mode. If the power controller integrated circuit chip 10 is in the battery backup mode, and if an electrical load with a relatively high capacitance on its power supply terminal is connected to the power controller, this high capacitance load can operate to pull down the voltage of the substrate of the CMOS power controller integrated circuit 10 and cause the power controller integrated circuit 10 to latch up. The current limiting resistor 40 is placed in the circuit for the purpose of avoiding such latch up. In this example, if the resistor 40 were in place, it would limit the current trying to pull down the substrate voltage to the extent that the backup battery could supply appreciably more current than was being pulled from the substrate through the power supply output terminal 38, and the substrate would remain substantially at the backup battery voltage.

The circuit of FIG. 5 has the advantage that the diode formed according to the structure shown in FIG. 3A may be used for the diode 66 and only a single diode is required. Moreover, since the substrate voltage is used to drive the power supply output terminal 38, the substrate voltage will always be higher than, or equal to, the output voltage terminal 38.

Thus, by the use of the diodes 33 and 34, or the bipolar transistors 62 and 64, or the diode 66, the backup batteries can be effectively protected from being charged.

Although the invention has been described in part by making detailed reference to certain specific embodiments, such detail is intended to be and will be understood to be instructive rather than restrictive. It will be appreciated by those skilled in the art that many variations may be made in the structure and mode of operation without departing from the spirit and scope of the invention, as disclosed in the teachings herein. For example, the electrical load connected to the power supply output voltage terminal 38 is the static RAM 14 in the preferred embodiment but could be any electrical load suitable for use with a backup battery.

What is claimed is:

1. A power supply switching circuit embodied in a CMOS integrated circuit having an N-type substrate, said power supply switching circuit having a primary power source input terminal, a backup battery input terminal, and a power supply voltage output terminal, comprising:
    (a) comparison means for comparing the voltage at said primary power source input terminal to the voltage at said backup battery input terminal and for providing a first logic state at a first internal node if the voltage at said primary power supply input terminal is greater than the voltage at said backup battery input terminal, and for providing a second logic state at said first internal node if the voltage at said primary power supply input terminal is less than the voltage at said backup battery input terminal;
    (b) switching means coupled between said primary power supply input terminal and said power supply voltage output terminal for making a conductive path between said primary power supply input terminal and said power supply voltage output terminal when said first internal node is at said first logic state, and for providing a high impedance between said primary power source input terminal and said power supply voltage output terminal when said first internal node is at said second logic state;
    (c) first diode means coupled between said backup battery input terminal and said substrate of said CMOS integrated circuit for permitting current to flow substantially only in the direction from said backup battery input terminal to said substrate;
    (d) second diode means coupled between said backup battery input terminal and a second internal node of said power supply switching circuit for permitting current to flow substantially only in the direction from said backup battery input terminal into said second internal node; and
    (e) conduction means coupled between said second internal node and said power supply voltage output terminal for passing current between said second internal node and said power supply output terminal.

2. A power supply switching circuit as set forth in claim 1 wherein said conduction means further includes current limiting means for limiting the amount of current flowing between said second internal node and said power supply output terminal.

3. A power supply switching circuit as set forth in claim 1 wherein said second diode means is formed by the base emitter junction of an NPN bipolar transistor.

4. A power supply switching circuit embodied in a CMOS integrated circuit having an N-type substrate, said power supply switching circuit having a primary power source input terminal, a backup battery input terminal, and a power supply voltage output terminal, comprising:
    (a) comparison means for comparing the voltage at said primary power source input terminal to the voltage at said backup battery input terminal and for providing a first logic state at a first internal node if the voltage at said primary power supply input terminal is greater than the voltage at said backup battery input terminal, and for providing a second logic state at said first internal node if the voltage at said primary power supply input terminal is less than the voltage at said backup battery input terminal;
    (b) switching means coupled between said primary power supply input terminal and said power supply voltage output terminal for making a conductive path between said primary power supply input terminal and said power supply voltage output terminal when said internal node is at said first logic state, and for providing a high impedance between said primary power source input terminal and said power supply voltage output terminal when said internal node is at said second logic state;
    (c) diode means coupled between said backup battery input terminal and said substrate of said CMOS integrated circuit for permitting current to flow substantially only in the direction from said backup battery input terminal to said substrate; and
    (d) conduction means coupled between said substrate and said power supply voltage output terminal for passing current between said substrate and said power supply output terminal.

5. A power supply switching circuit as set forth in claim 4 wherein said conduction means further includes current limiting means for limiting the amount of current flowing between said substrate node and said power supply voltage output terminal.

6. A power supply switching circuit embodied in a CMOS integrated circuit having an N-type substrate, said power supply switching circuit having a primary power source input terminal, a backup battery input terminal, and a power supply voltage output terminal, comprising:
    (a) comparison means for comparing the voltage at said primary power source input terminal to the voltage at said backup battery input terminal and for providing a first logic state at a first internal node if the voltage at said primary power supply input terminal is greater than the voltage at said backup battery input terminal, and for providing a second logic state at said first internal node if the voltage at said primary power supply input terminal is less than the voltage at said backup battery input terminal;
    (b) first switching means coupled between said primary power supply input terminal and said power supply voltage output terminal for making a conductive path between said primary power supply input terminal and said power supply voltage output terminal when said first internal node is at said first logic state, and for providing a high impedance between said primary power source input terminal and said power supply voltage output terminal when said first internal node is at said second logic state;
    (c) second switching means coupled between said primary power supply input terminal and said N-type substrate for making a conductive path between said primary power supply input terminal and said N-type substrate when said first internal node is at said first logic state, and for providing a high impedance between said primary power source input terminal and said N-type substrate when said first internal node is at said second logic state;

(d) a first NPN bipolar transistor having its base coupled to said backup battery input terminal, its collector coupled to said N-type substrate, and its emitter coupled to said N-type substrate; and (e) a second NPN bipolar transistor having its base coupled to said backup battery input terminal, its collector coupled to said N-type substrate, and its emitter coupled to said power supply voltage output terminal.

* * * * *